United States Patent [19]

Hamilton et al.

[11] Patent Number: 5,050,957

[45] Date of Patent: Sep. 24, 1991

[54] OPTICAL FIBER SERVICE CABLE

[75] Inventors: Alfred S. Hamilton, Norcross; James R. Holman, Lilburn; Michael D. Kinard, Lawrenceville; Terry D. Mathis, Lilburn, all of Ga.

[73] Assignee: AT&T Bell Laboratories, Murray Hill, N.J.

[21] Appl. No.: 515,981

[22] Filed: Apr. 27, 1990

[51] Int. Cl.$^5$ ............................................. G02B 6/44
[52] U.S. Cl. .................................................. 385/113
[58] Field of Search ...................................... 350/96.23

[56] References Cited

U.S. PATENT DOCUMENTS

| | | | |
|---|---|---|---|
| 4,738,504 | 4/1988 | Jones | 350/96.23 |
| 4,743,085 | 5/1988 | Jenkins et al. | 350/96.23 |
| 4,761,053 | 8/1988 | Cogelia et al. | 350/96.23 |
| 4,844,575 | 7/1989 | Kinard et al. | 350/96.23 |
| 4,852,965 | 8/1989 | Mullin et al. | 350/96.23 |

OTHER PUBLICATIONS

R. A. Miller and M. Pomerantz, "Tatical Low Loss Optical Fiber Cables For Army Applications", Proceedings of the 23rd Wire and Cable Symposium, pp. 266–270, Dec. 3–5, 1974.

Primary Examiner—William L. Sikes
Assistant Examiner—Robert E. Wise
Attorney, Agent, or Firm—E. W. Somers

[57] ABSTRACT

An optical fiber cable (20) which is suitable for service from a distribution closure to a customer's premises includes a transmission media core (21) enclosed in a relatively rigid tubular member (40). The relatively rigid tubular member is enclosed in a jacket (44) comprising a plastic material which has a cut-through resistance which is substantially less than that of the tubular member. Interposed between the tubular member and an outer surface of the jacket is a strength member system comprising two yarn-like longitudinally extending strength member groups (52—52). The strength member grops are diametrically opposed to each other and are disposed in engagement with the tubular member.

16 Claims, 2 Drawing Sheets

OPTICAL FIBER SERVICE CABLE

TECHNICAL FIELD

This invention relates to an optical fiber service cable. More particularly, the invention relates to an optical fiber cable which may be used in a buried or overhead mode in a local area network to extend services from a distribution network to customer's premises.

BACKGROUND OF THE INVENTION

Optical fiber has found widespread application in longhaul signal transmission such as, for example, between cities. It has become apparent that optical fiber not only can advantageously be used as a long haul transmission medium but also economically in local networks including distribution, service or drop, and indoor cable. As a result, end-to-end optical communications is fast becoming a reality.

Optical fiber cables designed for long-haul applications typically are not well suited for use in the local distribution network. For instance, such cables typically are designed to have a medium to relatively high fiber count, are frequently relatively rigid and have a relatively large bending radius, and tend to be relatively costly to manufacture. On the other hand, cable for use in local distribution networks should have a low fiber count, e.g., less than about ten fibers, should be flexible, should be usable in a variety of environments, should be installable by existing procedures and equipment and should be easy to manufacture and low in cost.

A sought-after cable for such use should have desired performance properties. For example, it should have a relatively high tensile axial loading capability, have a relatively low minimum bend radius, have sufficient stiffness to minimize bend losses, and have an operating temperature range of about −40° C. to +60° C. The cable should be cushioned sufficiently to withstand repeated impacts by vehicles on structures routed across roadways during installation. Also, the sought after cable must be capable of being rendered water-resistant for buried use and not affected adversely by cable filling materials which provide such capability to the cable. Inasmuch as in some instances it will connect to customers' premises, the cable must be capable of being made flame retardant.

The prior art includes optical fiber cables that are designed for use in the local distribution network. For instance, S. Kukita et al, *Review of the Electrical Communications Laboratories*, Volume 32 (4), pp. 636–645 (1984) review the design and performance of optical drop and indoor cables, and disclose an indoor cable comprising a coated fiber surrounded by a polyvinyl chloride (PVC) jacket in which are embedded four steel wires. Such a design has some shortcomings, including a need for electrically grounding the steel wires, the difficulty in achieving good coupling between the jacket and the steel wires and the possibility of causing bending-induced stresses on the optical fiber.

A commercially available optical fiber cable that can find use in local distribution plant comprises a central steel or plastic strength member surrounded by a polyurethane jacket, a multiplicity of optical fiber-containing loose tubes stranded around the jacket, a polyethylene inner jacket surrounding the tubes, and a metallic armor and a polyethylene outer jacket surrounding the inner jacket. In such a structure, the fibers cannot be on the neutral axis of the cable when the cable is bent, requiring stranding of the loose tubes, which in turn complicates manufacture. Furthermore, in such a design, the strength member is not well coupled to the outer jacket.

Another commercially available optical fiber cable for use in a local distribution network includes a central coated steel wire strength member and multiplicity of plastic tubes arranged around the central strength member, each tube containing one buffered optical fiber as well as a moisture resistant filling compound. This core is surrounded by aramid yarn which is said to take up the greater part of any tensile load applied to the cable. The yarn layer in turn is surrounded by a polyethylene jacket. Such cables are useful as aerial or duct cable. For buried use, a polyurethane inner jacket replaces the polyethylene jacket, and a steel tape armoring and a polyethylene outer jacket surround the inner jacket. The tubes must be stranded inasmuch as the fibers are not on the neutral axis of the cable when the cable is bent. Furthermore, axial stresses are poorly coupled from the outer surface of the cable to the central strength member.

Inasmuch as present design buried service cables still have some drawbacks, efforts have continued to manufacture a buried service cable that provides an optical fiber transmission path onto customer premises. An optical fiber communications transmission cable of U.S. Pat. No. 4,723,831 which issued on Feb. 9, 1988 in the names of B. D. Johnson et al comprises a core comprising one or more optical fibers, a core wrap surrounding loosely the core, and three groups of longitudinally extending non-metallic strength members. Each group comprises one or more strength members completely embedded in a jacket and coupled thereto. The strength members are spaced equally in a circumferential direction. The jacket typically is not coupled to the core wrap to any substantial degree. For some applications of the cable, the voids between the optical fibers and the core wrap are filled with a waterblocking material. For indoor use, the cable advantageously includes flames retardant materials. The optical fibers typically have excess length, i.e., in any length $l_c$ of cable, the length $l_g$ of any optical fiber in the cable is greater than $l_c$ by some relatively small amount. Each one of the strength members embedded in the jacket includes a multiplicity of filaments impregnated with a material that is compatible with that of the jacket, resulting in substantial coupling between the jacket and the strength members embedded therein.

The cable of U.S. Pat. No. 4,723,831 also may comprise metallic armoring surrounding the jacket which becomes an inner jacket, surrounded by a polymer outer jacket. The outer jacket and the armoring are applied advantageously such that they are mechanically coupled to the inner jacket. This assures that longitudinal stresses that act on the outer surface of the outer jacket are transmitted to, and substantially borne by, the strength members.

Although the just-described cable overcomes some prior art problems, it is somewhat difficult to access the core without damaging the fibers. Also the strength members may wander in position as the inner jacket is extruded thereabout. Further, when the cable is subjected to bending, at least one of the strength members is put into compression and may cause unsightly bumps in the cable jacketing.

What still is needed is a buried service cable that extends from a distribution closure to a residence, that overcomes drawbacks of prior art offerings and that has suitable strength. Although placement of strength members in a jacket is preferred, care must be taken so that the extrusion of jacket material does not cause the strength members to be displaced.

Furthermore, and as mentioned hereinbefore, the sought-after cable should be capable of acceptable performance throughout a wide range of environmental conditions. At low temperatures, the optical fibers should be sufficiently decoupled from an enclosing sheath system to avoid undue buckling forces which otherwise could be applied to the fibers. Also, it becomes important for a craftsperson to be able to access easily the core and optical fibers therein. Further, after the fibers have been accessed, it should be relatively easy to remove any buffer coating from the glass fiber. This capability must exist with a very low probability that a craftsperson may damage the core which includes the optical fibers.

What is needed and what seemingly is not provided by the prior art is an optical fiber cable which may be used in the local area network to provide service to customer premises. The sought-after cable must have well defined strength member dispositions, must provide easy access to its fibers, must not sustain undue losses when subjected to temperature extremes, must be rugged in flexure, impact, compression and torsion and must be capable of being flame retardant and include waterblocking provisions.

SUMMARY OF THE INVENTION

The foregoing problems of the prior art have been overcome with the optical fiber cable of this invention. An optical fiber cable of this invention which is suitable for buried or overhead use in a local area network includes a core comprising at least one optical fiber which is enclosed in a relatively rigid tubular member comprised of a plastic material. Typically, the optical fiber includes one or more protective coating layers. The internal cross sectional area of the tubular member is equal to the product of at least two and the total transverse cross sectional area of the optical fibers therein. The tubular member may be filled with a waterblocking composition of matter. Disposed about the tubular member is a jacket which is comprised of a plastic material which is substantially less rigid than that of the tubular member. The plastic material of the jacket is characterized by a cut-through resistance which is substantially less than that of the plastic material of the tubular member. Disposed within the jacket and in engagement with the tubular member are two diametrically opposed strength member groups. Each of the strength members is in proximate engagement with the tubular member. Also, each strength member may comprise a filamentary yarn material which is impregnated with a resinous material.

In order to avoid undesired losses in the optical fibers during handling and environmental cycling of the cable, excess length fiber is included. Preferably, each optical fiber has a length which exceeds the cable length by a predetermined percent.

In another embodiment, the tubular member is enclosed by a tape which comprises a superabsorbent material and a metallic armor layer. Typically, the armor layer comprises bronze. The metallic armor layer is enclosed by a plastic jacket.

Furthermore, the cable has an outer diameter which is controlled to maintain the strength members spaced on either side of the tubular member and to provide suitable jacket material for flame retardance.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
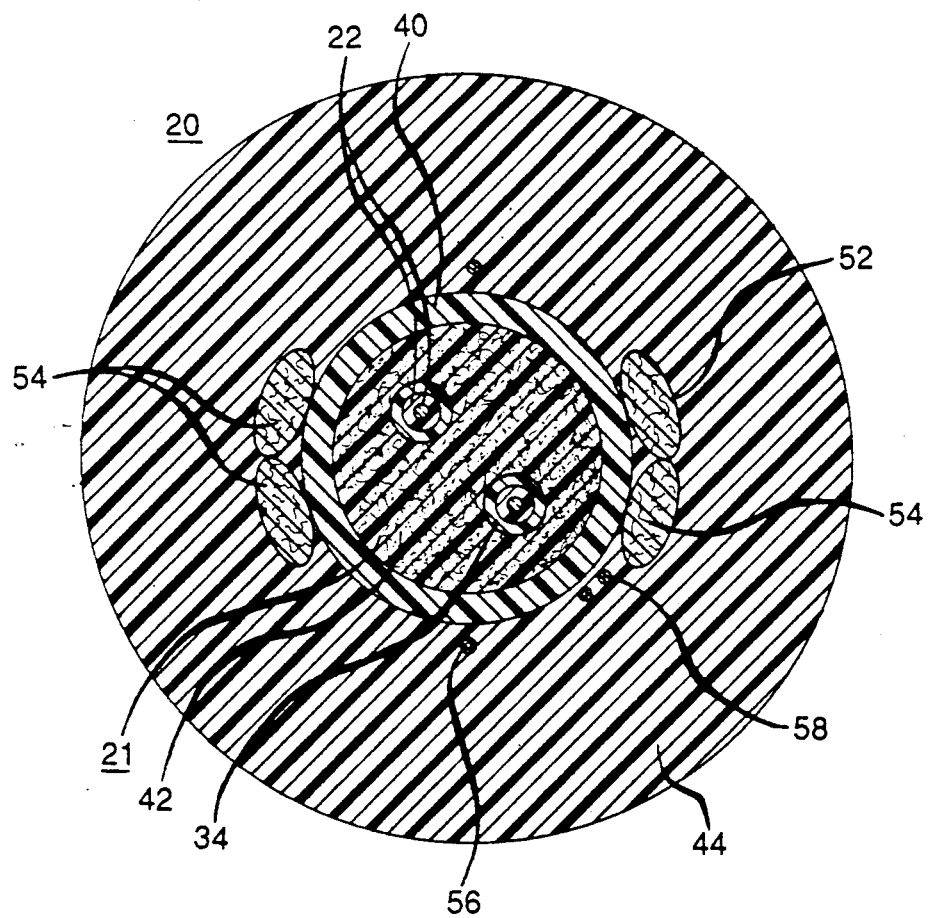
FIG. 1 is an end sectional view of an optical fiber service cable of this invention.

Referring now to FIG. 1, there is shown a cable being designated generally by the numeral 20 and having a core 21 which includes one or more optical fibers 22. The cable 20 is a cable which is suitable for distribution service to customer premises. The optical fiber 22 is provided with one or more protective coating layers and in a preferred embodiment with a buffer coating 34. The buffer coating 34 typically comprises a polyester elastomer or polyvinyl chloride (PVC) plastic which has been extruded over the coated optical fiber. Typically, buffered optical fiber for use in the cable 20 has an outer diameter of about 0.089 cm.

Enclosing the optical fibers in the core is a tubular member 40. The tubular member 40 is made of a plastic material characterized by a substantially high cut-through resistance. Desirably, the tubular member 40 is made of nylon, polybutylene terephthalate or polypropylene. Consequently, when a craftsperson removes outer covering material with the aid of a knife, for example, the fibers are protected from damage by the relatively tough tubular member. To access the core fibers, a score is made around the tubular member 40. Then the tubular member is bent to pop open the tubular member and expose the fibers.

Also, it is important that the optical fibers be able to seek out a position of minimum stress when the cable 20 is bent. This is accomplished by causing the area defined by the inner wall of the tubular member 40 to be equal to the product of at least two and the total transverse cross sectional areas of the coated optical fibers.

Interposed among the optical fibers and between the optical fibers and the tubular member in a preferred embodiment of this invention, which may be used in a buried environment, is a filling composition of matter 42. This composition of matter provides suitable waterblocking characteristics for the optical fiber 22. The filling material 42 must possess certain properties. It has been determined that in an optical fiber cable, a filling composition must also function to maintain the optical fibers in a relatively low state of stress. Such a material may be a colloidal particle-filled grease composition which is disclosed in U.S. Pat. No. 4,701,016 which issued on Oct. 20, 1987, in the names of C. H. Gartside III, et al. and which is incorporated by reference hereinto. The composition of the waterblocking material 42 is intended to block effectively entry of water into the core while minimizing the added loss to the cable in order to provide excellent optical performance.

A grease typically is a solid or semiliquid substance comprising a thickening or gelling agent in a liquid carrier. The gelling agents used in greases frequently are fatty acid soaps, but high melting point materials, such as clays, silicas, organic dyes, aromatic amides, and urea derivatives also may be used.

When a low stress is applied to a grease, the material acts substantially as a solid-like material. If the stress is above a critical value, then the viscosity decreases rapidly and the material flows. The decrease in viscosity is largely reversible because typically it is caused by the rupture of network junctions between filler particles, and these junctions can reform following the removal of the supercritical stress.

A cable filling or waterproofing material, especially an optical fiber cable filling compound, should meet a variety of requirements. Among them is the requirement that the physical properties of the cable remain within acceptable limits over a rather wide operating temperature range, e.g. from about −40° C. to about +60° C. It is also desirable that the filling material be relatively free of syneresis over the aforementioned temperature range. Syneresis is the separation of oil from the gel under applied stress. Filling materials for use in optical fiber cables also should have a relatively low shear modulus. According to the prior art, the shear modulus is a critical material parameter of optical fiber cable filling materials because it is believed to be directly related to the amount of microbending loss. For a discussion of microbending loss, see S. E. Miller et. al., Optical Fiber Telecommunications, Academic Press, New York (1979), pp. 158-161. Typically, microbending loss is more difficult to control at long wavelengths than at short ones. Thus, it is important to be able to produce optical fiber cable that has no significant cabling-induced losses at long wavelengths such as, for example, 1.55 μm.

The preferred waterblocking material is a composition which comprises two major constituents, namely oil, and a gelling agent such as colloidal particles, and, optionally, a bleed inhibitor. Preferably, the waterblocking composition includes a thermal oxidative stabilizer. The constituents are disclosed in the above-identified Gartside, et al. patent.

It has been determined that, at least for some applications, a low value of shear modulus of the filling material is not sufficient to assure low cabling loss, and that a further parameter, the critical yield stress, also needs to be controlled. Typically, the critical yield stress of material according to the invention is not greater than about 70 Pa, measured at 20° C. whereas the shear modulus is less than about 13 kPa at 20° C.

Advantageously, the waterblocking material 42 which is used to fill the core of the cable of this invention yields at a low enough stress so that the optical fiber 22 is capable of moving within the tubular member 40 when the cable is loaded or bent. Because the yielding filling material 42 allows the optical fiber to move within the tubular member, the stress therein is reduced, microbending is minimized and the life of the optical fiber is lengthened.

The filling material 42 for the reinforced optical fiber unit 22 also may be flame-retardant. This may be accomplished by including in the hereinbefore described composition a flame-retardant constituent such as chlorinated paraffin and/or $Al_2O_3.3H_2O$.

Surrounding the tubular member 40 is a jacket 44. Typically, the jacket 44 is made of a plastic material characterized by a cut-through resistance which is substantially less than that of the tubular member. Polyvinyl chloride (PVC) is suitable for use as the jacket. Because of the material of the jacket, it becomes relatively easy for a craftsperson to cut through the jacket to access the tubular member 40 which envelopes the core 21.

After a craftsperson has exposed the tubular member by slitting the outer jacket, the optical fibers need to be accessed to facilitate splicing for example. This is accomplished by scoring and bending the tubular member.

The removal of any buffer material to expose the fibers is accomplished by using buffered fibers having a decoupling material disposed between the coated optical fiber and the buffer layer. As a result, there is sufficient adhesion between the buffer layer and the underlying coating material to maintain the buffer layer in place during normal use of the buffered optical fiber. On the other hand, the adhesion is low enough so that the buffer layer may be removed upon the application of reasonably low stripping forces. Advantageously, the decoupling material also allows the selective removal of the optical fiber coating material as well as the plastic buffer layer. Such an arrangement is disclosed in commonly owned U.S. application Ser. No. 07/385,755 which was filed on Jul. 26, 1989 in the names of M. F. Marx, et al. and which is incorporated by reference hereinto.

Optical fiber cables of the type discussed herein may be subjected to substantial tensile forces during deployment and/or during service. Because optical fibers generally can sustain only limited tensile loads before breaking, and because their optical loss increases with strain, it is an object of the invention to provide a cable in which the fibers are substantially decoupled from tensile stresses applied to the outside of the cable. This is accomplished by substantial coupling between the jacket and strength members embedded therein, low coupling between the jacket and the tubular member and excess length of each optical fiber with respect to the tubular member.

In order to provide suitable tensile strength properties, the cable includes a strength member system which may include portions 52—52 each including at least one strength member 54. In a preferred embodiment, each strength member comprises a filamentary material.

As can be seen in the FIG. 1, each strength member is in proximate engagement with the tubular member 40. This arrangement avoids excess tension if the cable is bent in a plane normal to the preferred plane of bending which extends through the portions 52—52 of the strength member system. This causes the cable 20 to have enhanced flexibility. The strength members are arranged so that they do not engage the optical fiber.

The strength members 54—54 must have suitable strength characteristics to prevent tensile load failure. Tensile load failure is caused by abrasion, flaws and tensile load imbalance. Filaments of a strength member are abraded by neighboring filaments in the environment of use and by particles in a subsequently extruded jacket. Such abrasion may become most severe under some conditions. Flaws occur with the probability that increases with the filament length and cause tensile load failures in a length of time which is approximately inversely proportional to the cable length. Uneven sharing of the tensile load results when the filaments are not coupled to share the tensile loads evenly. As some filaments break, others accept the load until the total cross section of the strength member fails.

To overcome these problems, impregnated rovings or yarns are used as strength members. Coupling of the strength members to the jacket, and resistance to failure of the strength members under load, are both enhanced by suitable impregnation of the filaments. Impregnating material coats each filament with a layer which protects against abrasion and couples each filament to its neighbor to bridge flaws and establish tensile load balance. In a preferred embodiment, the strength members are comprised of a plurality of E-glass fibers. E-glass fibers comprise a borosilicate glass composition, with the fibers having a minimum tensile strength of 200,000 psi. In an exemplary preferred embodiment, each strength member comprises rovings, each roving comprising about 2,000 fibers. Although the strength member cross section may be substantially circular, non-circular, e.g., oval-like, strength members appear in FIG. 1.

The strength members typically are impregnated with a material that promotes coupling to the jacket and that exhibits a relatively high coefficient of static friction with the material of the jacket. Impregnating material may be formed by condensation or addition polymerization reactions and may include, for example, urethanes, acrylic acid or acrylate-based materials, epoxies, polyesters, and polyvinyl chloride or other vinyl based materials. For strength member materials such as fiberglass, a coupling agent or sizing such as silane is used to couple the impregnating material to the filaments; for material such as aramid fiber, a coupling agent may not be required. However, although aramid fiber is very suitable for use as the strength member, such material is relatively expensive. For an example of a method of impregnating a bundle of filaments, see U.S. Pat. No. 4,479,984 which issued on Oct. 30, 1984 in the names of N. Levy and P. D. Patel.

Impregnating roving or yarn overcomes a disadvantage of plain roving or yarn for the strength members. Unlike plain roving or yarn, any flaws in any of the filaments are bridged by the impregnating material which also prevents abrasion. Impregnation increases the flex life of the completed structure over that of unimpregnated roving. The impregnating material also serves as part of the waterblocking system for the optical fiber cable.

A significant aspect of the preferred embodiment of the invention is the number and placement of strength members. It should be observed that the two portions of the strength member system are arranged in a particular fashion about the tubular member 40. They are arranged so as to be diametrically opposite to each other and to fall along the transverse axis of symmetry of the tubular member and jacket. As a result, the cable has a preferred plane of bending with two of the strength members experiencing only minimal compression. Furthermore, the neutral axis of the bent cable extends through the fiber-containing cavity, thereby permitting fibers to move so as to be on, or somewhat close to, the neutral axis. Also, it has been found that the use of two groups of strength members offers advantages. Among the above-referred to advantages are the resulting flexibility of the cable structure, and maintenance of the fibers in a relatively stress-free condition even for bend radii as small as 2.5 cm.

Although in currently preferred embodiments of the inventive cable, the fibers within the core member and the strength members are to be substantially layless, i.e., not stranded, and the strength members are also substantially untwisted, these conditions are not requirements. At least under some circumstances, twisted strength members, and/or slightly stranded strength members and/or optical fibers may be used.

In preferred embodiment, the fibers in the core have excess length over the length of the tubular member 40. For any length of cable, the length of any one of the fibers disposed within the tubular member is greater than the length of the cable. The amount of excess length is such that, for any given cable design, the cable strain under maximum permissible tensile load results in less than maximum permissible fiber strain. A further consideration in the desired degree of excess length is the introduction of microbending loss due to fiber undulation. Fiber undulation is the natural consequence of excess length, with the undulatory wavelength decreasing with increasing excess length. Because susceptibility to microbending loss is a function of fiber design, no general upper limit of permissible excess length is given. However, it has been determined that an excess fiber length of about 0.3% does not lead to unacceptable microbending loss.

A further microbending-related consideration is the cross sectional area available to the fibers within the tubular member 40. In particular, a small tubular member diameter results in relatively short undulation length, which in turn may result in increased microbending loss. This problem is overcome with the hereinbefore mentioned inner area of the tubular member 40 with respect to the total transverse cross sectional area of the fiber in the core.

Although FIG. 1 shows a cable with two optical fibers in the core, it will be appreciated that the same cable design can be used with one or a plurality of optical fibers. For instance, for distribution and building riser cable applications, it may be desirable to have a larger number of fibers present, possibly 4, 8 or 12 fibers. On the other hand, for use as service lightguide or on customer premises, a single fiber, e.g., one single mode fiber, is expected to be sufficient in many cases. It will also be understood that although FIG. 1 discloses buffered fibers, this is not required and unbuffered fibers, i.e., fibers carrying only a polymer coating, may be used.

Furthermore, although FIG. 1 shows a cable with a filled core, core filling is not a requirement, and unfilled cable according to the invention can be used, for instance, in building applications, such as riser cable or plenum. However, it has been found that the impact resistance of the tubular member 40 is substantially enhanced by providing the filling material 42.

Also, it is important that the buried service cable of this invention be sufficiently flame-retardant to pass industry tests. Flame retardance of the cable is provided by the material of the jacket which preferably is polyvinyl chloride (PVC). The outside diameter of the jacket 44 must be sufficient to provide sufficient jacket thickness and hence quantity of PVC to provide the desired degree of flame retardance. In the preferred embodiment, the outer diameter of the cable jacket is 0.91 cm.

Not only should the cable 20 be flame retardant, but if used in buried service applications, it also must include additional waterblocking provisions to prevent the internal longitudinal flow of water. This may accomplished by including not only the filling material 42 but also waterblocking provisions of the type disclosed in C. J. Arroyo et al U.S. Pat. No. 4,815,813 which issued on Mar. 28, 1989 and which is incorporated by reference hereinto. In a preferred embodiment, two yarns 56—56 are wrapped helically in opposite directions about the outermost portions of the strength members 52—52 and the tubular member 40. A rip cord 58 having an encircling waterblocking yarn also may be provided to facilitate removal of the jacket.

Cable of the type shown in FIG. 1 can advantageously be used in building applications, be buried directly, or placed into conduits. It is a dielectric structure and therefore substantially immune to lightning strike. On the other hand, it is not well-protected against rodents or digging equipment as is another embodiment of this invention which is shown in FIG. 2.

Figure 2:
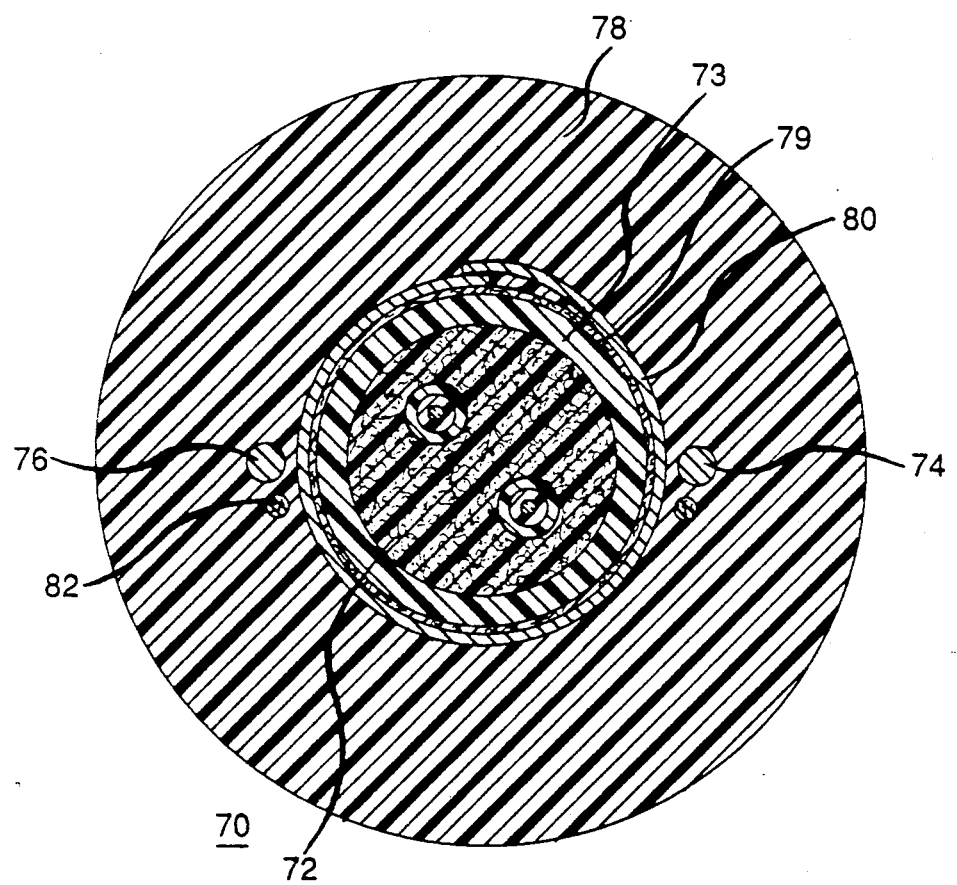
FIG. 2 is an end sectional view of an alternative embodiment.

A cable 70 depicted in FIG. 2 includes a core 72 identical to the core of the cable 20, a tubular member 73, a strength member system 74 having diametrically opposed strength members 76—76 and a plastic jacket 78. The cable 70 includes additional components over and above those of the cable 20. As can be seen, the tubular member 73 is enclosed by a waterblocking tape 79 and by protective layer 80. In a preferred embodiment the layer 80 is comprised of a metal tape such as a bronze tape. The waterblocking tape may be one such as is described in C. J. Arroyo U.S. Pat. No. 4,867,526 which issued on Sept. 19, 1989. Wrapped about the strength members and the bronze armor are two waterblocking yarns 82—82. The yarns 82—82, as were the yarns in the preferred embodiment, are wrapped in opposite helical directions. Additional yarns may be wrapped about each strength member.

The bronze armor layer 80 provides additional capabilities for the cable. Firstly, the bronze armor provides additional mechanical protection for the cable. Also, it may be used to assist in locating buried cables. This is accomplished by imparting a signal to the bronze armor and detecting the signal by suitable above-ground apparatus.

The resulting cables are robust cables which may be used in providing fiber to a customer's premises. Present day thinking is not to use a single cable with multiple breakouts to individual homes. Instead a two fiber cable of this invention is to be routed from a pole, for example, or distribution cabinet to a customer's premises. In the event of gopher attack on such a system, only a single customer is affected.

The neutral axis of the cable 70 when bent extends through the fiber-containing cavity, thereby permitting fibers to move. When a cable of this invention is bent, the optical fibers disposed within the tubular member fall below the neutral plane of bending toward that portion of the jacket which is in compression. As a result the optical fibers are not in tension as the cable is bent about the preferred plane of bending.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which is suitable for use in a local area network for distribution to individual customers and which has a generally circular configuration in a plane normal to a longitudinal axis of the cable, said cable comprising:

a core which includes at least one optical fiber which includes at least one protective coating;

a tubular member which encloses said at least one optical fiber, said tubular member being made of a first plastic material having a relatively high shearing resistance and having a cross sectional area defined by an inner surface which is equal to the product of at least two and the transverse cross sectional area of optical fiber in said core;

a jacket which encloses said tubular member, said jacket comprising a second plastic material which is characterized by a shearing resistance that is less than that of the plastic material of said tubular member and that is sufficiently low to facilitate cutting of the jacket to access said tubular member, said jacket having a thickness and being made of a material which causes said jacket to have suitable flame retardancy; and a strength member system which is disposed between said tubular member and an outer surface of said jacket, said strength member system including two portions which are diametrically opposed to each other and which are closely adjacent to a diameter of said cable to cause said cable to have a preferred plane of bending, each said portion of said strength member system being at least in proximate engagement with said tubular member without engaging the optical fiber in said core.

2. The optical fiber cable of claim 1, wherein said tubular member is filled with a waterblocking material.

3. The optical fiber cable of claim 2, wherein said waterblocking material comprises an oil and a gelling agent.

4. The optical fiber cable of claim 3, wherein said waterblocking material is characterized by a yield stress not greater than about 70 Pa measured at 20° C. and a shear modulus less than about 13 KPa at 20° C.

5. The optical fiber cable of claim 1, wherein said tubular member is comprised of a plastic material which exhibits a relatively high cut-through resistance and which is selected from the group consisting of nylon, polybutylene terephthalate and polypropylene.

6. The optical fiber cable of claim 5, wherein said jacket comprises a polyvinyl chloride plastic material.

7. The optical fiber of claim 1, wherein each of said strength members is comprised of a non-metallic material.

8. The optical fiber cable of claim 1, wherein each of said strength members comprises a filamentary material.

9. The optical fiber cable of claim 8, wherein each of said strength member comprises a fiberglass yarn which is impregnated with a resinous material.

10. The optical fiber cable of claim 8, wherein each of said strength members comprises a yarn which is impregnated with a urethane based material.

11. The optical fiber cable of claim 1, which also includes waterblocking yarn material wrapped helically longitudinally about said strength member system and said tubular member.

12. The optical fiber cable of claim 1, which further includes a metallic armor layer which is wrapped longitudinally about said tubular member.

13. The optical fiber cable of claim 12, wherein said metallic armor layer comprises bronze.

14. The optical fiber cable of claim 13, which also includes a waterblocking tape which is disposed between said metallic armor layer and said tubular member.

15. The optical fiber cable of claim 12, wherein said strength member system comprises diametrically opposed metallic strength members.

16. The optical fiber cable of claim 1, wherein each optical fiber in said core has a length which exceeds that of the tubular member.

* * * * *